(12) United States Patent
Hasegawa

(10) Patent No.: US 12,458,317 B2
(45) Date of Patent: Nov. 4, 2025

(54) X-ray IMAGING DEVICE, X-ray IMAGING SYSTEM, AND METHOD OF CONTROLLING X-ray IMAGING DEVICE

(71) Applicant: CANON MEDICAL SYSTEMS CORPORATION, Otawara (JP)

(72) Inventor: Takuya Hasegawa, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 397 days.

(21) Appl. No.: 17/888,597

(22) Filed: Aug. 16, 2022

(65) Prior Publication Data

US 2023/0059156 A1    Feb. 23, 2023

(30) Foreign Application Priority Data

Aug. 20, 2021   (JP) .................. 2021-134946

(51) Int. Cl.
*A61B 6/00* (2024.01)
*A61B 6/46* (2024.01)
(Continued)

(52) U.S. Cl.
CPC .............. *A61B 6/548* (2013.01); *A61B 6/467* (2013.01); *A61B 6/542* (2013.01); *G01V 5/222* (2024.01);
(Continued)

(58) Field of Classification Search
CPC ........... A61B 6/467; A61B 6/54; A61B 6/542; A61B 6/548; A61B 6/547; A61B 6/04892
See application file for complete search history.

(56) References Cited

U.S. PATENT DOCUMENTS

2012/0163534 A1* 6/2012 Nambu .................. A61B 6/486
378/44
2012/0250973 A1* 10/2012 Nambu .................. A61B 6/469
382/132
(Continued)

FOREIGN PATENT DOCUMENTS

DE    10 2012 205 549 A1   10/2013
DE       102014207127 A1 * 10/2015  ............... A61B 6/04
(Continued)

OTHER PUBLICATIONS

Translation of DE-102014207127. (Year: 2015).*
(Continued)

*Primary Examiner* — David P Porta
*Assistant Examiner* — Soorena Kefayati
(74) *Attorney, Agent, or Firm* — Oblon, McClelland, Maier & Neustadt, L.L.P.

(57) ABSTRACT

According to an embodiment, an X-ray imaging device includes an irradiator, an exposure switch device, and a control device. The irradiator irradiates a subject placed on a bed with X-rays. The exposure switch device receives an operation of an operator related to X-ray irradiation. The control device controls the X-ray irradiation based on the X-rays. The exposure switch device includes a switch and an output. The switch is set on the basis of a position of the operator and detects the operation of the operator. The output outputs an operation signal based on the operation of the operator to the control device when the operation of the operator has been detected by the switch.

13 Claims, 6 Drawing Sheets

(51) Int. Cl.
*G01N 23/04* (2018.01)
*G01V 5/222* (2024.01)

(52) U.S. Cl.
CPC ......... *G01N 23/04* (2013.01); *G01N 2223/40* (2013.01)

(56) References Cited

U.S. PATENT DOCUMENTS

| | | | | |
|---|---|---|---|---|
| 2014/0037068 | A1* | 2/2014 | Burion | A61B 6/467 378/95 |
| 2015/0087971 | A1* | 3/2015 | Burion | A61B 6/467 600/424 |
| 2015/0320367 | A1* | 11/2015 | Dirauf | A61B 6/0407 700/275 |
| 2016/0081650 | A1* | 3/2016 | Okusu | A61B 6/566 715/826 |
| 2016/0287193 | A1* | 10/2016 | Katsumata | A61B 6/54 |
| 2016/0378938 | A1* | 12/2016 | Kuhrt | G16H 40/63 700/302 |
| 2017/0020469 | A1* | 1/2017 | Lee | A61B 6/4417 |
| 2017/0154158 | A1* | 6/2017 | Marka | G05B 19/048 |
| 2017/0360390 | A1* | 12/2017 | Tajima | A61B 6/548 |
| 2019/0076106 | A1* | 3/2019 | Tkaczyk | A61B 6/0407 |
| 2019/0150876 | A1* | 5/2019 | Kagermeier | A61B 6/548 |
| 2019/0151043 | A1* | 5/2019 | Wada | G16H 30/40 |
| 2019/0354200 | A1 | 11/2019 | Rapoport | |
| 2019/0357867 | A1* | 11/2019 | Endoh | A61B 6/465 |
| 2019/0388040 | A1* | 12/2019 | Vancamberg | A61B 6/502 |
| 2020/0113635 | A1* | 4/2020 | Ida | A61B 90/37 |
| 2022/0113809 | A1* | 4/2022 | Dietz | A61B 8/467 |

FOREIGN PATENT DOCUMENTS

| | | |
|---|---|---|
| EP | 3 586 755 A1 | 1/2020 |
| JP | 2007-014540 A | 1/2007 |
| JP | 2018-191842 A | 12/2018 |
| JP | 2020-058672 A | 4/2020 |
| WO | WO 2018/012080 A1 | 1/2018 |

OTHER PUBLICATIONS

Machine translation of DE-102014207127—(Year: 2014).*
Extended European Search Report issued Jan. 13, 2023 in European Patent Application No. 22190635.7, 8 pages.
Office Action issued Mar. 18, 2025, in corresponding Japanese Patent Application No. 2021-134946, 5 pages.

* cited by examiner

X-ray IMAGING DEVICE, X-ray IMAGING SYSTEM, AND METHOD OF CONTROLLING X-ray IMAGING DEVICE

CROSS-REFERENCE TO RELATED APPLICATION

The present application claims priority based on Japanese Patent Application No. 2021-134946 filed on Aug. 20, 2021, the content of which is incorporated herein by reference.

FIELD

Embodiments disclosed in the present specification and the drawings relate to an X-ray imaging device, an X-ray imaging system, and a method of controlling the X-ray imaging device.

BACKGROUND

In an X-ray imaging device such as an X-ray computed tomography (CT) device, for example, a CT fluoroscopy operation console (hereinafter referred to as an operation console) configured to be operated by an operator is provided and a foot switch is connected to the operation console via a cable. The foot switch outputs, for example, an operation signal to the operation console in accordance with an operation of the operator, and the operation console outputs the output operation signal to a control device connected to the operation console. The control device causes an irradiator provided in the X-ray imaging device to radiate X-rays in accordance with the operation signal output from the operation console.

During an examination process using the X-ray imaging device, for example, the operator performs the examination process while moving around the X-ray imaging device, so that the foot switch can be moved in accordance with a standing position of the operator or the like. When the foot switch is moved, for example, the operator holds and moves the foot switch by hand, but there are problems such as difficulty in carrying the foot switch, unfavorable hygiene, and this being an opportunity for disconnection of a cable.

DETAILED DESCRIPTION

Hereinafter, an X-ray imaging device, an X-ray imaging system, and a method of controlling the X-ray imaging device according to embodiments will be described with reference to the drawings. Although the X-ray imaging device is an X-ray CT device in the embodiments, the X-ray imaging device may be another device. The X-ray imaging device may be, for example, a tomosynthesis imaging device.

According to an embodiment, an X-ray imaging device includes an irradiator, an exposure switch device, and a control device. The irradiator irradiates a subject placed on a bed with X-rays. The exposure switch device receives an operation of an operator related to X-ray irradiation. The control device controls the X-ray irradiation based on the X-rays. The exposure switch device includes a switch and an output. The switch is set on the basis of a position of the operator and detects the operation of the operator. The output outputs an operation signal based on the operation of the operator to the control device when the operation of the operator has been detected by the switch.

First Embodiment

Figure 1:
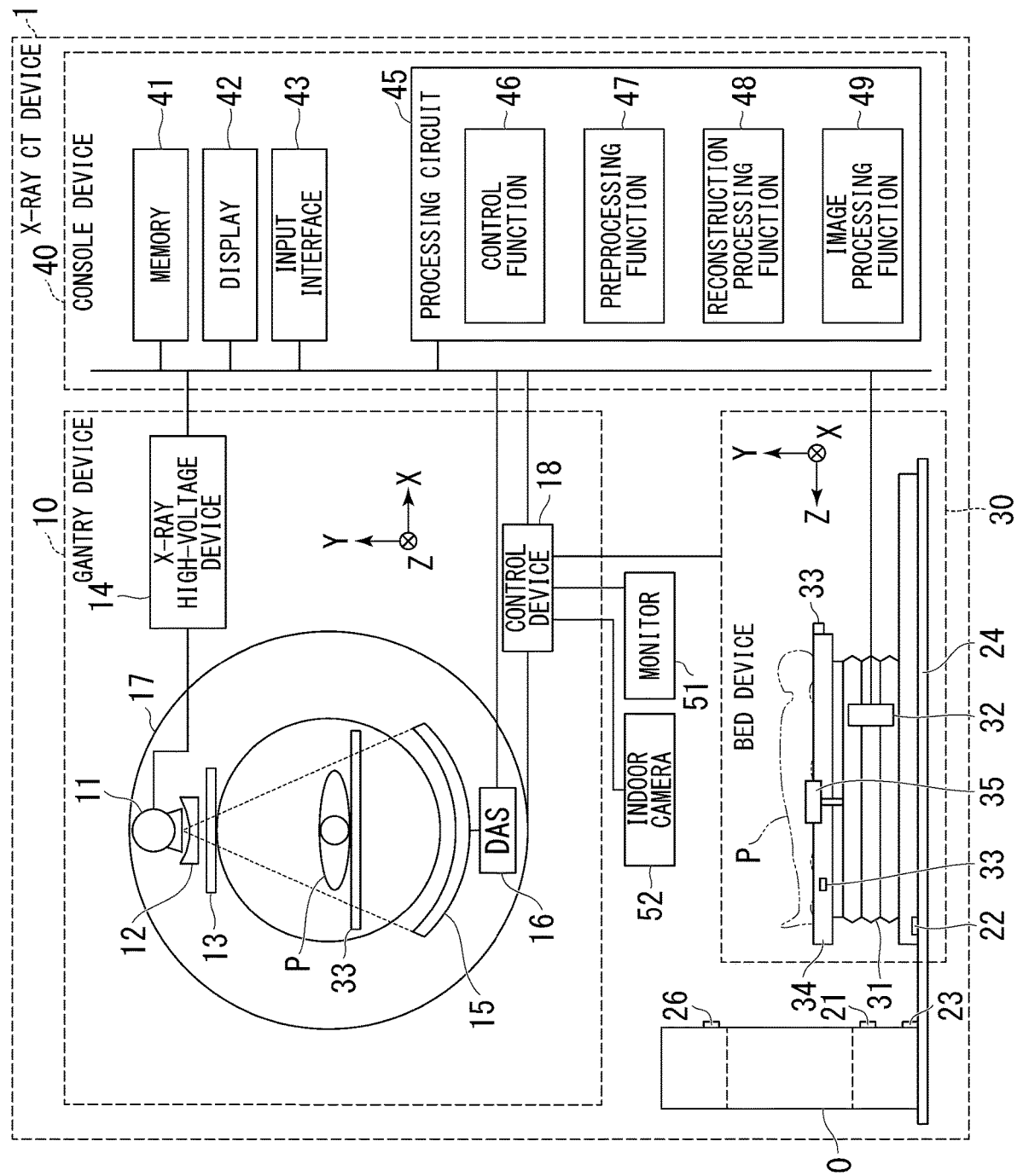
FIG. 1 is a configuration diagram of an X-ray CT device 1 according to a first embodiment.
Figure 2:
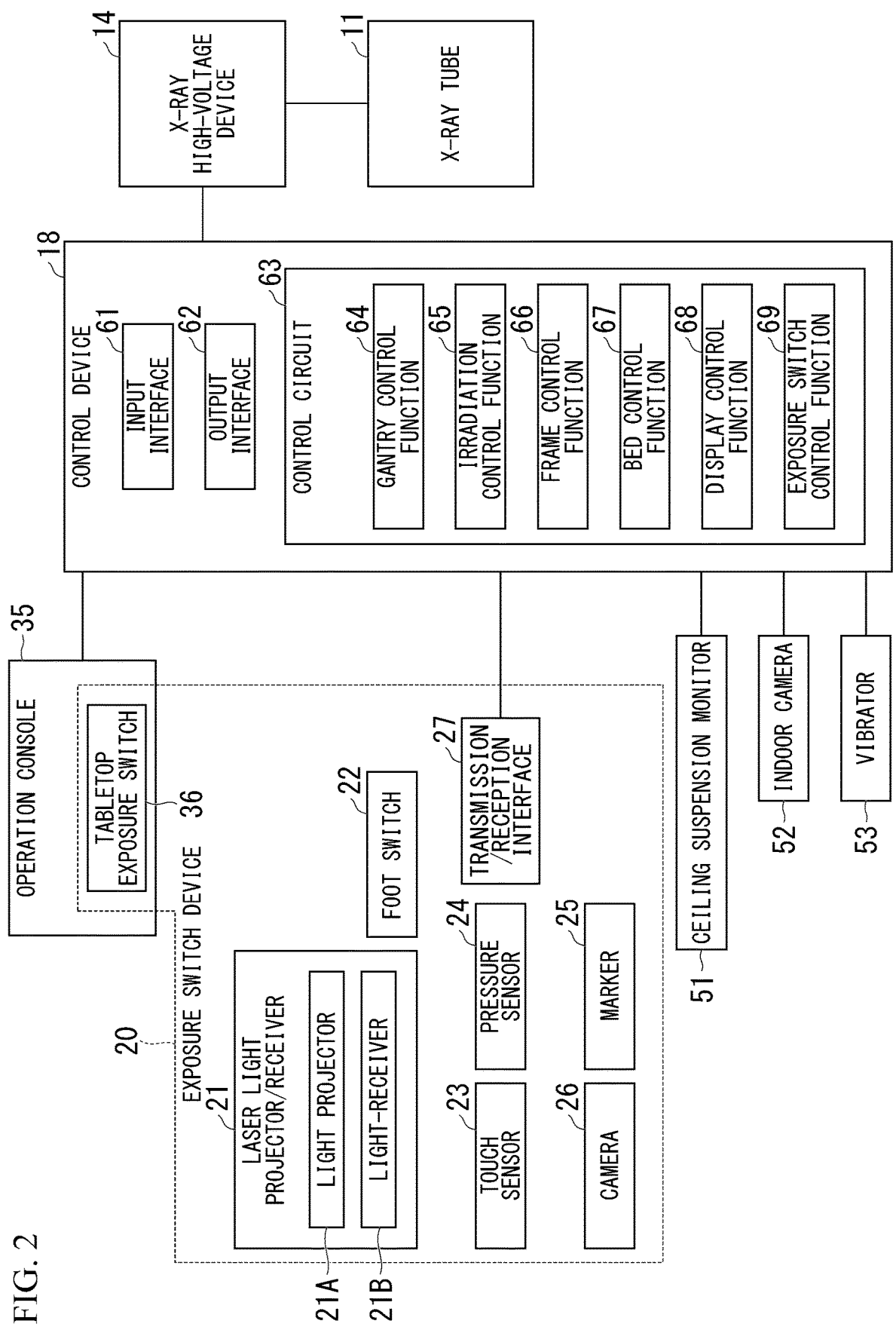
FIG. 2 is a configuration diagram of a part of the X-ray CT device 1 according to the first embodiment.
Figure 3:
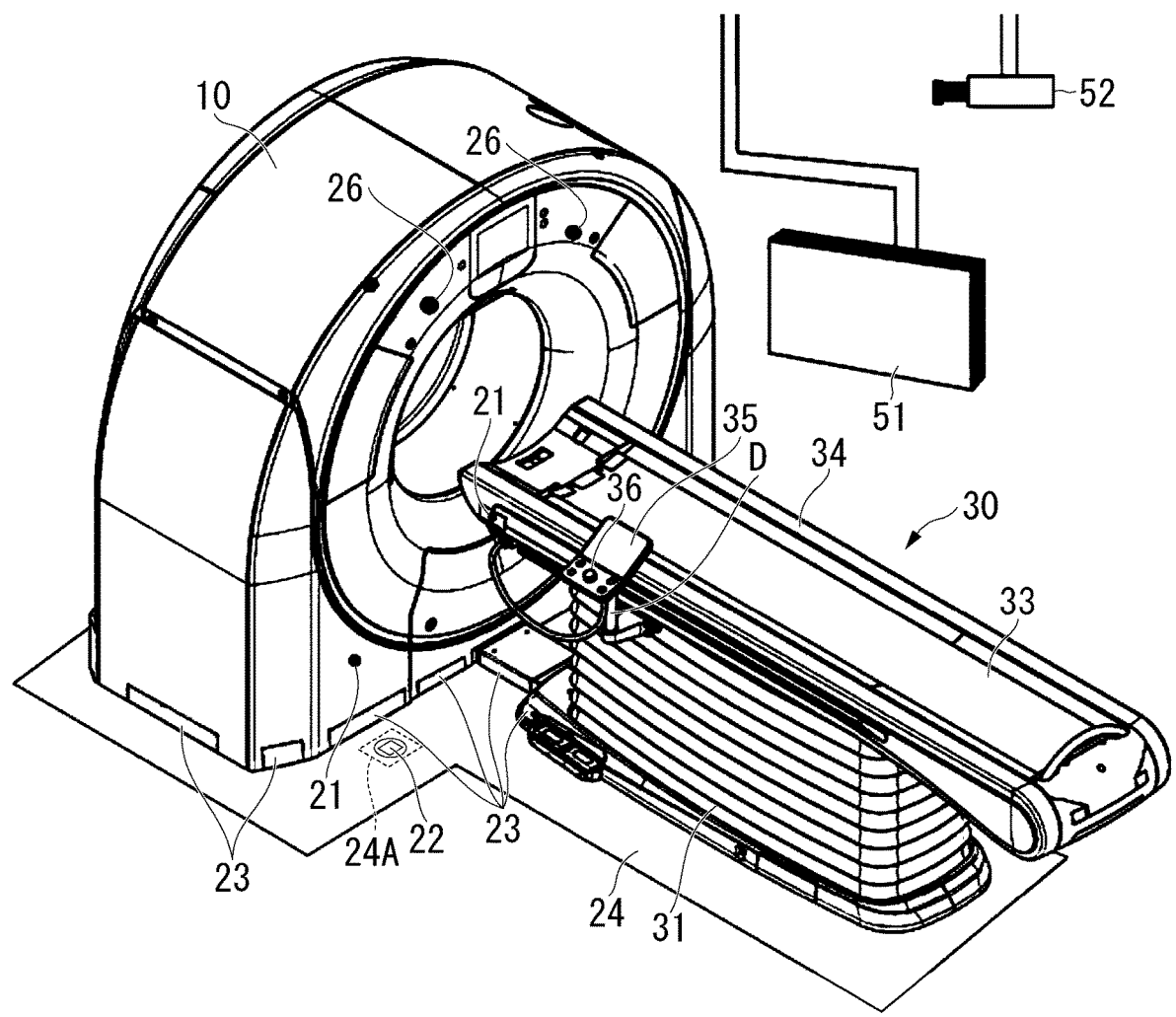
FIG. 3 is an overall perspective view of the X-ray CT device 1 according to the first embodiment.

FIG. 1 is a configuration diagram of an X-ray CT device 1 according to a first embodiment. FIG. 2 is a configuration diagram of a part of the X-ray CT device 1 according to the first embodiment. FIG. 3 is an overall perspective view of the X-ray CT device 1 according to the first embodiment. The X-ray CT device 1 includes, for example, a gantry device 10, an exposure switch device 20, a bed device 30, a console device 40, a ceiling suspension monitor 51, an indoor camera 52, and a vibrator 53. The X-ray CT device 1 is installed in, for example, a treatment room. The X-ray CT device 1 captures a contrast CT image for performing image diagnosis. The X-ray CT device 1 is an example of an X-ray imaging device.

Although both a view of the gantry device 10 from a Z-axis direction and a view of the gantry device 10 from an X-axis direction are shown for convenience of description in FIG. 1, the number of gantry devices 10 is one in reality. In the embodiment, a direction of a rotational axis of a rotational frame 17 in a non-tilted state or a longitudinal direction of a top plate 33 of the bed device 30 is defined as the Z-axis direction, a direction of an axis orthogonal to the Z-axis direction and horizontal to a floor surface is defined as the X-axis direction, and a direction orthogonal to the Z-axis direction and vertical to the floor surface is defined as a Y-axis direction. In the following description, a direction along the Z-axis is referred to as a forward-backward direction, a direction along the X-axis is referred to as a left-right direction, and a direction along the Y-axis is referred to as an upward-downward direction.

The gantry device 10 includes, for example, an X-ray tube 11, a wedge 12, a collimator 13, an X-ray high-voltage device 14, an X-ray detector 15, a data acquisition system (hereinafter referred to as a DAS) 16, the rotational frame 17, and a control device 18. The X-ray tube 11, the wedge 12, the collimator 13, the X-ray high-voltage device 14, the X-ray detector 15, the DAS 16, the rotational frame 17, and the control device 18 are accommodated in a gantry.

The X-ray tube 11 generates X-rays by radiating thermal electrons from a cathode (a filament) to an anode (a target) by applying a high voltage from the X-ray high-voltage device 14. The X-ray tube 11 includes a vacuum tube. For example, the X-ray tube 11 is a rotating anode-type X-ray tube that generates X-rays by irradiating a rotating anode with thermal electrons. The X-ray tube 11 irradiates the subject P placed on the top plate 33 with X-rays. The X-ray tube 11 is an example of an irradiator.

The wedge 12 is a filter for adjusting an X-ray dose that is radiated from the X-ray tube 11 to a subject P serving as an image diagnosis target. The wedge 12 attenuates X-rays passing through itself so that a distribution of the X-ray dose radiated from the X-ray tube 11 to the subject P becomes a predetermined distribution. The wedge 12 is referred to as a wedge filter or a bow-tie filter. The wedge 12 is made, for example, by processing aluminum so that a prescribed target angle and a prescribed thickness are formed.

The collimator 13 is a mechanism for narrowing down an irradiation range of X-rays transmitted through the wedge 12. The collimator 13 narrows down the irradiation range of X-rays by a slit being formed, for example, according to a combination of a plurality of lead plates. The collimator 13 may be referred to as an X-ray diaphragm. A narrowing-down range of the collimator 13 may be according to mechanical driving.

The X-ray high-voltage device 14 has, for example, a high-voltage generation device and an X-ray control device. The high-voltage generation device has an electric circuit including a transformer, a rectifier, and the like and generates a high voltage that is applied to the X-ray tube 11. The X-ray control device controls an output voltage of the high-voltage generation device in accordance with the X-ray dose to be generated in the X-ray tube 11. The high-voltage generation device may be one that boosts a voltage using the above-mentioned transformer or may be one that boosts a voltage using an inverter. The X-ray high-voltage device 14 may be provided on the rotational frame 17 or may be provided on a side of a fixed frame (not shown) of the gantry device 10.

The X-ray detector 15 detects an intensity of incident X-rays generated by the X-ray tube 11 and passing through the subject P. The X-ray detector 15 outputs an electrical signal (which may be an optical signal or the like) according to the detected intensity of the X-rays to the DAS 16. The X-ray detector 15 has, for example, a plurality of X-ray detection element arrays. Each of the plurality of X-ray detection element arrays is an array of a plurality of X-ray detection elements in a channel direction along an arc centered on a focal point of the X-ray tube 11. The plurality of X-ray detection element arrays are arrayed in a slice direction (a column direction or a row direction).

The X-ray detector 15 is an indirect detector having, for example, a grid, a scintillator array, and an optical sensor array. The scintillator array has a plurality of scintillators. Each scintillator has a scintillator crystal. The scintillator crystal emits light in an amount of light according to the intensity of incident X-rays. The grid is disposed on a plane on which the X-rays of the scintillator array are incident and has an X-ray shielding plate having a function of absorbing scattered X-rays. Also, the grid may also be referred to as a collimator (a one-dimensional collimator or a two-dimensional collimator). The optical sensor array has, for example, an optical sensor such as a photomultiplier tube (PMT). The optical sensor array outputs an electrical signal according to an amount of light emitted by the scintillator. The X-ray detector 15 may be a direct conversion type detector having a semiconductor element that converts incident X-rays into an electrical signal.

The DAS 16 has, for example, an amplifier, an integrator, and an analog-to-digital (A/D) converter. The amplifier performs an amplification process for an electrical signal output by each X-ray detection element of the X-ray detector 15. The integrator integrates the electrical signal for which the amplification process has been performed during a view period. The A/D converter converts an electrical signal indicating an integration result into a digital signal. The DAS 16 outputs detection data based on the digital signal to the console device 40.

The rotational frame 17 is an annular rotational member that rotates the X-ray tube 11, the wedge 12, the collimator 13, and the X-ray detector 15 in a state in which the rotational frame 17 is retained facing them. The rotational frame 17 is rotatably supported by the fixed frame around the subject P introduced inside. The rotational frame 17 further supports the DAS 16. The detection data output by the DAS 16 is transmitted from a transmitter having a light-emitting diode (LED) provided in the rotational frame 17 to a receiver having a photodiode provided in a non-rotational portion (for example, a fixed frame) of the gantry device 10 using optical communication and is transferred to the console device 40 through the receiver. A method of transmitting the detection data from the rotational frame 17 to the non-rotational portion is not limited to the above-mentioned method using optical communication and any non-contact type transmission method may be adopted. The rotational frame 17 is not limited to an annular member as long as it can support and rotate the X-ray tube 11 or the like, and may be a member such as an arm.

The X-ray CT device 1 is, for example, a rotate/rotate-type X-ray CT device (third-generation CT) in which both the X-ray tube 11 and the X-ray detector 15 are supported by the rotational frame 17 and rotate around the subject P, but is not limited thereto. The X-ray CT device 1 may be a stationary/rotate-type X-ray CT device (fourth-generation CT) in which a plurality of X-ray detection elements arrayed in an annular shape are fixed to a fixed frame and the X-ray tube 11 rotates around the subject P.

The control device 18 can, for example, cause the rotational frame 17 to be rotated, cause the gantry of the gantry device 10 to be tilted, cause the top plate 33 of the bed device 30 to be moved in an upward/downward movement or the like, and cause the radiation (exposure) of X-rays from the X-ray tube 11 to be carried out. The control device 18 may be provided in the gantry device 10 or the console device 40. The configuration, process, and the like of the control device 18 will be further described below.

The exposure switch device 20 shown in FIG. 2 receives an operation of the operator related to X-ray irradiation. The exposure switch device 20 requests the control device 18 to perform irradiation with X-rays from the X-ray tube 11, for example, by receiving an operation in which the operator depresses an exposure switch, as an operation related to the X-ray irradiation.

The exposure switch device 20 includes, for example, a laser light projector/receiver 21, a foot switch 22, a touch sensor 23, a pressure sensor 24, a marker 25, a camera 26, and a transmission/reception interface 27. The exposure switch device 20 includes, for example, four laser light projectors/receivers 21, two cameras 26, and a large number of touch sensors 23.

The laser light projectors/receivers 21 are disposed at positions on both sides between which the bed device 30 is sandwiched on a surface (hereinafter referred to as a front surface) of the gantry device 10 at a side on which the bed device 30 is provided and left- and right-side surfaces of the bed device 30. The laser light projector/receiver 21 provided on the gantry device 10 is arranged at a lower position in the gantry device 10, for example, a position below the top plate 33 in the bed device 30.

The laser light projector/receiver 21 includes a light projector 21A and a light-receiver 21B. The light projector 21A projects laser light onto, for example, the floor surface of the treatment room. The laser light projector/receiver 21 projects laser light to generate the foot switch 22 serving as the exposure switch on the floor surface of the treatment room. The laser light projector/receiver 21 can project the laser light around the bed device 30 or at any position on the floor surface on the side of the gantry of the gantry device 10. The laser light is an example of visible light. The visible light may be light other than laser light.

The foot switch 22 includes reflected light generated by reflecting light when the laser light projector/receiver 21 projects the laser light onto the floor surface of the treatment room. Because the laser light projector/receiver 21 can project the laser light at any position around the bed device 30, the foot switch 22 can be generated at any position around the bed device 30. The foot switch 22 is generated by the laser light projector/receiver 21 radiating the laser light at a position near the operator on the basis of the position of the operator. Because the foot switch 22 is visible light, the operator can visually recognize the foot switch 22.

The light-receiver 21B of the laser light projector/receiver 21 receives the reflected light of the foot switch 22. When the operator performs an operation of depressing the foot switch 22 (hereinafter referred to as the foot switch operation), the light-receiver 21B of the laser light projector/receiver 21 cannot receive the reflected light of the foot switch 22. The laser light projector/receiver 21 uses this phenomenon to detect an operation of the operator on the foot switch 22 on the basis of a reflected light reception result of the light receiver. Specifically, the laser light projector/receiver 21 detects the foot switch operation of the operator when the foot switch 22 is not received optically while projecting the foot switch 22. The foot switch 22 is an example of a switch.

The light-receiver 21B of the laser light projector/receiver 21 receives the reflected light of the foot switch 22 formed on the floor surface of the treatment room. When it is detected that the operator has depressed the foot switch 22 because the light projector 21A projects the foot switch 22 but the light-receiver 21B does not receive the reflected light of the foot switch 22, the laser light projector/receiver 21 outputs an electrical signal indicating the operation of the foot switch to the transmission/reception interface 27. An electrical signal indicating the foot switch operation is an example of the operation signal.

The plurality of touch sensors 23 are provided apart from each other across a wide range on lower ends of the front surface of the gantry device 10 and both side surfaces in the X-direction. The touch sensor 23 can be touched by the operator and detects a position when the operator directly makes contact or the operator's shoe makes contact as a position of the operator. The touch sensor 23 outputs an electrical signal indicating the detected position of the operator to the transmission/reception interface 27. The touch sensor 23 is an example of a position detector.

The pressure sensor 24 is provided around, for example, the gantry device 10 and the bed device 30. The pressure sensor 24 is spread around the gantry device 10 and the bed device 30. The pressure sensor 24 detects the load applied from above. The pressure sensor 24 detects changes in a position (hereinafter referred to as a loading position) where the load is applied and a pressure value (hereinafter referred to as a loaded weight) applied by the pressure sensor 24. The pressure sensor 24 outputs an electrical signal related to the detected loading position and loaded weight to the transmission/reception interface 27.

A part of the pressure sensor 24 in the vicinity of the operator is set as a part that functions as the exposure switch.

The pressure sensor 24 detects a load application operation of the operator when the operator performs an operation (hereinafter referred to as a load application operation) of depressing a part (hereinafter referred to as an effective pressure sensor) 24A functioning as the exposure switch within the pressure sensor 24. When the pressure sensor 24 detects the load application operation of the operator on the effective pressure sensor 24A, the pressure sensor 24 outputs an electrical signal indicating the load application operation to the transmission/reception interface 27. The effective pressure sensor 24A in the pressure sensor 24 is an example of a switch. The electrical signal indicating the load application operation is an example of an operation signal.

Figure 4:
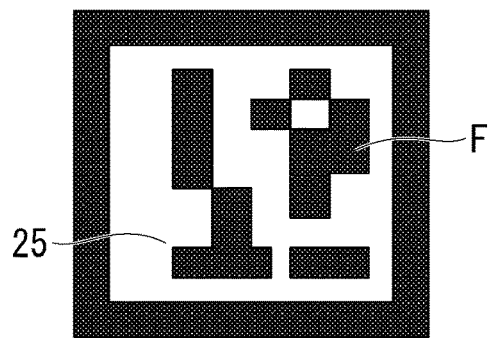
FIG. 4 is a diagram showing an example of a marker 25 according to the first embodiment.

The marker 25 is provided, for example, on a holder attached to the operator's foot. The marker 25 or the holder provided with the marker 25 may be attached to clothing worn by the operator or may be attached to his/her shoe or the like. FIG. 4 is a diagram showing an example of the marker 25 according to the first embodiment. The marker 25 includes a printing portion F. The printing portion F has a shape according to information. The marker 25 may be, for example, of a sticker type printed on a medium such as paper and attached to shoes or the like, or may be pre-printed on shoes or the like.

The cameras 26 are provided on both the left and right sides between which the bed device 30 is sandwiched on the front surface of the gantry device 10. The camera 26 is provided at a high position on the front surface of the gantry device 10, for example, near the top of the gantry device 10. The camera 26 captures an image of surroundings of the bed device 30. The image captured by the camera 26 includes, for example, the operator's foot, the foot switch 22, the marker 25, and the like. The camera 26 outputs the captured image to the transmission/reception interface 27.

The transmission/reception interface 27 transmits, for example, the electrical signals output by the laser light projector/receiver 21, the touch sensor 23, and the pressure sensor 24, the image output by the camera 26, and the like, to the control device 18. The transmission/reception interface 27 outputs, for example, the electrical signal transmitted by the control device 18, to the laser light projector/receiver 21. The transmission/reception interface 27 transmits the electrical signal indicating the foot switch operation or the load application operation output by the laser light projector/receiver 21 or the pressure sensor 24 to the control device 18. The transmission/reception interface 27 is an example of an output.

The bed device 30 is a device on which the subject P of a scan target is placed and introduced into the rotational frame 17 of the gantry device 10. The bed device 30 includes, for example, a base 31, a bed drive device 32, the top plate 33, a support frame 34, and an operation console 35. The base 31 includes a housing that movably supports the support frame 34 in the vertical direction (the Y-axis direction). The bed drive device 32 includes a motor and an actuator. The bed drive device 32 moves the top plate 33 on which the subject P is placed along the support frame 34 in the longitudinal direction (the Z-axis direction) of the top plate 33. The top plate 33 is a plate-shaped member on which the subject P is placed.

The operation console 35 is an input device for the operator to operate the bed device 30 in the vicinity of the subject P. The operation console 35 includes, for example, a frame body and a touch panel surrounded by the frame body. The operation console 35 is detachably fixed to, for example, the support frame 34 of the bed device 30 by a stand D. The operation console 35 may be fixed to a position other than the support frame 34 in the bed device 30, the gantry device 10, or the like. The operation console 35 is movably attached to any position of the bed device 30 or the like.

The operation console 35 may independently stand on a part of the bed device 30, for example, the top plate 33 or the support frame 34. The operation console 35 may be fixed or may be movable in the vertical direction (the upward/downward direction). The operation console 35 may be movable in the left-right direction along rails provided on the top plate 33 and the support frame 34.

A tabletop exposure switch 36 is provided on the operation console 35. When the operator operates the tabletop exposure switch 36, the operation console 35 outputs an electrical signal for requesting the X-ray irradiation to the control device 18. The tabletop exposure switch 36 is, for example, an operation button provided on the frame body of the operation console 35. The tabletop exposure switch 36 may be a switch of another form or may be, for example, a graphical user interface (GUI) image displayed on a display of the operation console 35. The tabletop exposure switch 36 has a built-in lamp such as an LED. In the tabletop exposure switch 36, when the exposure of X-rays is possible, a lamp is turned on to notify the operator that the exposure is possible.

The console device 40 has, for example, a memory 41, a display 42, an input interface 43, and a processing circuit 45. Although the console device 40 will be described as a body separate from the gantry device 10 in the embodiment, the gantry device 10 may include some or all of components of the console device 40.

The memory 41 is implemented by, for example, a semiconductor memory element such as a random access memory (RAM) or a flash memory, a hard disk, an optical disk, or the like. The memory 41 stores, for example, detection data, projection data, reconstructed image data, CT image data, and the like. This data may be stored in an external memory with which the X-ray CT device 1 can communicate, instead of the memory 41 (or in addition to the memory 41). The external memory is controlled by a cloud server, for example, when the cloud server that manages the external memory receives a read/write request.

The display 42 displays various types of information. For example, the display 42 displays a medical image (a CT image) generated by a processing circuit, a GUI image for receiving various types of operations of the operator such as a doctor or a technician, and the like. The display 42 is, for example, a liquid crystal display, a cathode ray tube (CRT), an organic electroluminescence (EL) display, or the like. The display 42 may be provided on the gantry device 10. The display 42 may be a desktop type or a display device (for example, a tablet terminal) capable of wirelessly communicating with the main body of the console device 40.

The input interface 43 receives various types of input operations of the operator and outputs an electrical signal indicating content of the received input operations to the processing circuit 45. For example, the input interface 43 receives input operations of an acquisition condition when detection data or projection data is acquired, a reconstruction condition when a CT image is reconstructed, and an image processing condition when a post-processed image is generated from the CT image.

The input interface 43 is implemented by, for example, a mouse, a keyboard, a touch panel, a drag ball, a switch, a button, a joystick, a camera, an infrared sensor, a microphone, or the like. The input interface 43 may be implemented by a display device (for example, a tablet terminal) capable of performing wireless communication with the main body of the console device 40.

Also, in the present specification, the input interface is not limited to one provided with physical operation parts such as a mouse and a keyboard. For example, an electrical signal processing circuit that receives an electrical signal corresponding to an input operation from external input equipment provided separately from the device and outputs the electrical signal to a control circuit is included as an example of the input interface.

The processing circuit 45 has, for example, a processor such as a central processing unit (CPU). The processing circuit 45 controls an overall operation of the X-ray CT device 1. The processing circuit 45 includes, for example, a control function 46, a preprocessing function 47, a reconstruction processing function 48, and an image processing function 49. The processing circuit 45 implements these functions by, for example, a hardware processor executing a program stored in a storage device (a storage circuit).

The hardware processor is, for example, circuitry such as a CPU, a graphics processing unit (GPU), an application specific integrated circuit (ASIC), a programmable logic device (for example, a simple programmable logic device (SPLD) or a complex programmable logic device (CPLD)), or a field programmable gate array (FPGA). Instead of storing the program in the storage device, the program may be configured to be embedded directly within the circuit of the hardware processor. In this case, the hardware processor implements the functions by reading and executing the program embedded within the circuit. The hardware processor is not limited to the configuration of a single circuit, but may be configured as a single hardware processor obtained by combining a plurality of independent circuits to implement each function. The storage device may be a non-transitory (hardware) storage medium. Also, a plurality of components may be integrated into one hardware processor to implement each function.

The components of the console device 40 or the processing circuit 45 may be decentralized and implemented by a plurality of pieces of hardware. The processing circuit 45 does not have a configuration of the console device 40 and may be implemented by a processing device capable of communicating with the console device 40. The processing device is, for example, a workstation connected to one X-ray CT device, or a device (for example, the cloud server) connected to a plurality of X-ray CT devices and configured to collectively execute processes equivalent to those of the processing circuit 45 to be described below. The functions included in the processing circuit 45 may be distributed to a plurality of circuits or may be made available by activating the application software stored in the memory 41.

The control function 46 controls various types of functions of the processing circuit 45 on the basis of the input operation received by the input interface 43. In the control function 46, it is possible to execute control by either a simple plan or an expert plan (a CT fluoroscopy plan) when the subject P is examined by the X-ray CT device 1. The simple plan is, for example, a plan preset in the X-ray CT device 1 and is a plan with few settings of the operator. The expert plan is, for example, a plan that can be arranged so that the operator can easily perform an examination, and is a plan for requesting the X-ray exposure process of the X-ray tube 11 according to the operation of the operator.

The simple plan and the expert plan are set, for example, by the operator operating the input interface 43. In the control function 46, when either the simple plan or the expert plan is selected and the examination is started, it is determined whether or not the X-ray CT device 1 is in a ready state in which the preparation for the exposure of X-rays has been completed such as a state in which the warm-up of the X-ray tube 11 has been completed. In the control function 46, when it is determined that the X-ray CT device 1 is in the ready state, an electrical signal indicating the ready state is output to the control device 18. The simple plan and the expert plan may be selected by the control device 18.

In the preprocessing function 47, preprocessing such as a logarithmic conversion process, an offset correction process, a sensitivity correction process between channels, and a beam hardening correction process is performed for the detection data output by DAS 16, projection data is generated, and the generated projection data is stored in the memory 41.

In the reconstruction processing function 48, CT image data is generated by performing a reconstruction process based on a filter correction back projection method, a successive approximation reconstruction method, or the like for the projection data generated in the preprocessing function 47 and the generated CT image data is stored in the memory 41.

The image processing function 49 converts CT image data into three-dimensional image data or cross-sectional image data of any cross-section using a known method on the basis of the input operation received by the input interface 43. The conversion into the three-dimensional image data may be performed in the preprocessing function 47. In addition, the console device 40 includes a preparation notification lamp configured to be turned on when the X-ray CT device 1 is in the ready state and the X-rays exposure process of the X-ray tube 11 is possible.

The ceiling suspension monitor 51 is provided, for example, to be suspended from the ceiling of the treatment room. The ceiling suspension monitor 51 displays an image (a video) in accordance with control processes of the display processing function 76 in the control device 18 and/or the display control function 68 in the processing circuit 45. The operator within the treatment room can visually recognize the image displayed on the ceiling suspension monitor 51 from any position, for example, a position near the bed device 30. The ceiling suspension monitor 51 is fixed to the ceiling of the treatment room, but may be rotatably mounted, for example, around a vertical axis.

The indoor camera 52 is provided, for example, to be suspended from the ceiling of the treatment room on the side of the ceiling suspension monitor 51. The indoor camera 52, for example, captures an image including the operator within the treatment room. The indoor camera 52 transmits the captured image to the control device 18. The indoor camera 52 is fixed to the ceiling of the treatment room, but may be rotatably mounted, for example, around a vertical axis.

Figure 5:
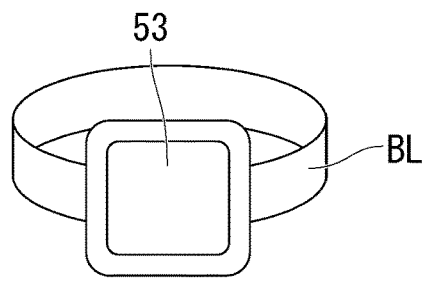
FIG. 5 is a diagram showing an example of a vibrator 53 according to the first embodiment.

The vibrator 53 is used, for example, so that it comes into contact with the skin of the operator. FIG. 5 is a diagram showing an example of the vibrator 53 according to the first embodiment. The vibrator 53 is attached to, for example, a belt BL. The vibrator 53 is brought into contact with the operator's skin, for example, by wrapping the belt BL around the operator's ankle. The vibrator 53 may be attached to the operator's shoe or clothing, or may be built in his/her shoe or the like.

The vibrator 53 acts on the operator's senses (five senses) to sensually notify the operator that the operator is operating the foot switch 22 or the effective pressure sensor 24A functioning as the exposure switch. The vibrator 53 is an example of a notification device. The vibrator 53 sensually notifies the operator of his/her operation on the foot switch 22 or the pressure sensor 24 by applying vibrations to the operator. The vibrator 53 is an example of a vibration device.

Next, a configuration of the control device 18 will be described. The control device 18 includes a communication interface 61 and a control circuit 63. The control device 18 further includes a drive mechanism including a motor, an actuator, and the like. The communication interface 61 inputs the electrical signals output by the exposure switch device 20, the tabletop exposure switch 36 provided on the operation console 35, and the like, the image output by the indoor camera 52, and the like, and outputs the electrical signals, the image, and the like to the control circuit 63. The communication interface 61 outputs an electrical signal output by the control circuit 63 to the X-ray high-voltage device 14, the ceiling suspension monitor 51, or the like.

The control circuit 63 has, for example, a processor such as a CPU. The control circuit 63 controls operations of devices included in the gantry device 10 and the bed device 30. The control circuit 63 includes, for example, a gantry control function 64, an irradiation control function 65, a frame control function 66, a bed control function 67, a display control function 68, and an exposure switch control function 69. The control circuit 63 implements these functions by, for example, a hardware processor executing a program stored in a storage device (a storage circuit).

The gantry control function 64 controls the gantry of the gantry device 10 and causes, for example, the gantry, to be tilted. The irradiation control function 65 causes, for example, the exposure signal generated by the exposure switch control function 69, to be output to the X-ray high-voltage device 14 using the communication interface 61. The X-ray high-voltage device 14 to which the exposure signal is output by the communication interface 61 causes the X-rays exposure process of the X-ray tube 11 to be carried out by applying a high voltage to the X-ray tube 11. In the frame control function 66, the rotational frame 17 is controlled and, for example, the rotational frame 17 is rotated or the rotating rotational frame 17 is stopped.

In the bed control function 67, the operation of the bed device 30 is controlled and, for example, the bed device 30 is raised or lowered. In the display control function 68, various images are displayed on the display of the ceiling suspension monitor 51 or the operation console 35. The display control function 68 causes, for example, an image captured by the indoor camera 52, to be displayed on the ceiling suspension monitor 51. By displaying the image captured by the indoor camera 52 on the ceiling suspension monitor 51, the operator can recognize the positions of the foot switch 22 and the effective pressure sensor 24A while looking at the ceiling suspension monitor 51 without looking at the feet.

The exposure switch control function 69 controls each device included in the exposure switch device 20 when a control process of the control function 46 of the processing circuit 45 is executed in the expert plan. In the exposure switch control function 69, the X-rays exposure process of the X-ray tube 11 can be requested when the X-ray CT device 1 is in the ready state.

In the exposure switch control function 69, an electrical signal and an image output from the touch sensor 23, the pressure sensor 24, and the camera 26 via the transmission/reception interface 27 are acquired. The exposure switch control function 69 causes the foot switch 22 to be projected using the laser light projector/receiver 21, or causes an exposure signal to be output to the X-ray high-voltage device 14 through the communication interface 61, on the basis of a result of performing image processing for the acquired electrical signal or the acquired image.

Figure 6:
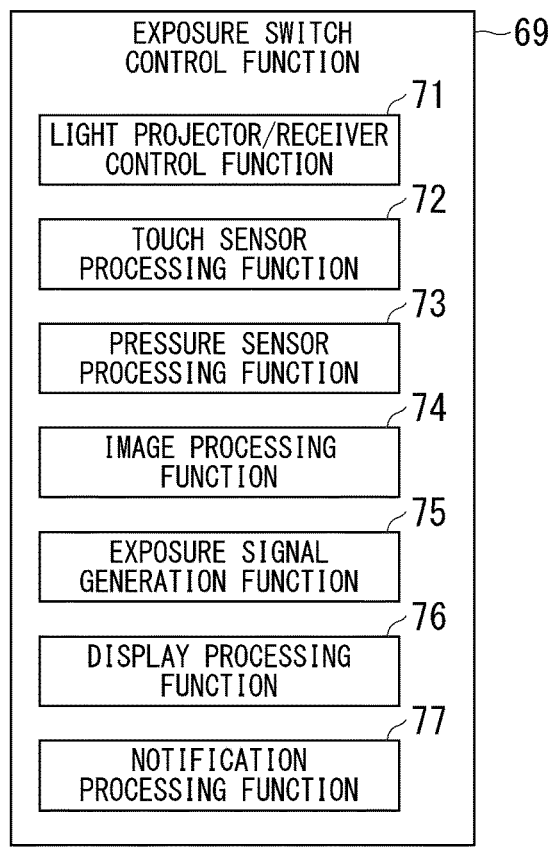
FIG. 6 is a diagram showing an example of a functional configuration of an exposure switch control function 69 according to the first embodiment.

FIG. 6 is a diagram showing an example of a functional configuration of the exposure switch control function 69 according to the first embodiment. The exposure switch control function 69 includes, for example, a light projector/receiver control function 71, a touch sensor processing function 72, a pressure sensor processing function 73, an image processing function 74, an exposure signal generation function 75, a display processing function 76, and a notification processing function 77.

In the light projector/receiver control function 71, when the processing circuit 45 outputs an electrical signal indicating a ready state, the X-ray CT device 1 is determined to be in the ready state, the laser light projector/receiver 21 is allowed to project laser light, and the foot switch 22 is generated. In the light projector/receiver control function 71, the position where the foot switch 22 is generated is set in the vicinity of the position of the operator on the basis of the position of the operator detected by the touch sensor 23 when the X-ray CT device 1 is in the ready state. The light projector/receiver control function 71 causes the laser light projector/receiver 21 to project the laser light so that the foot switch 22 is generated at the set position. Furthermore, the processing circuit 45 outputs an electrical signal indicating the ready state, and the lamp built in the tabletop exposure switch 36 is turned on when the X-ray CT device 1 is in the ready state.

In the touch sensor processing function 72, the position of the operator detected by the touch sensor 23 and transmitted by the transmission/reception interface 27 is acquired and the position of the operator is recognized. In the light projector/receiver control function 71, a position where the foot switch 22 is generated is set on the basis of the position of the operator recognized by the touch sensor processing function 72.

The pressure sensor processing function 73 identifies a portion of the pressure sensor 24 that functions as the exposure switch as the effective pressure sensor 24A on the basis of the position of the operator recognized in the touch sensor processing function 72. In the pressure sensor processing function 73, the identified portion of the pressure sensor 24 is set as the effective pressure sensor 24A.

The image processing function 74 acquires an image captured by the camera 26 or the indoor camera 52. The image processing function 74 acquires information about the exposure of X-rays by performing image processing on the acquired image. The image processing function 74 recognizes, for example, whether or not the marker 25 is included in the image captured by the camera 26. The camera 26 and the indoor camera 52 are examples of a camera.

In the image processing function 74, when it is recognized that the image captured by the camera 26 includes the marker 25, a position where the marker 25 is recognized is recognized as the position of the operator. In both the touch sensor processing function 72 and the image processing function 74, the position of the operator is detected. If two positions are different, either position of the operator is prioritized. For example, the position of the operator recognized in the image processing function 74 is prioritized and used as the position of the operator. The image processing function 74 is an example of an image processor. The camera 26, the indoor camera 52, and the image processing function 74 are examples of the position detector.

In the exposure signal generation function 75, when an electrical signal associated with the light projector 21A output by the transmission/reception interface 27 has been received, it is determined whether or not an operation in which the operator depresses the foot switch 22 or the effective pressure sensor 24A is an operation intended by the operator on the basis of an image analysis result according to image processing of the image processing function 74. The operation of depressing the foot switch 22 is determined on the basis of a relationship between the light projection and reception detected in the light projector/receiver control function 71. The operation of depressing the effective pressure sensor 24A is determined on the basis of the loading position and the loaded weight detected by the pressure sensor 24. Thus, there is a possibility that an operation different from the depression operation of the operator may be misrecognized as the depression operation of the operator.

Therefore, the exposure signal generation function 75 recognizes the operation (movement) of the operator using an image processing result of the image processing function 74 and verifies whether or not the operator has performed the depression operation. In the exposure signal generation function 75, it is determined that the operation has been intended by the operator when a result of image analysis according to image processing indicates that the operator has performed the depression operation and the operation has not been intended by the operator when a result of image analysis according to image processing indicates that the operator has not performed the depression operation. For example, when the laser light projected by the laser light projector/receiver 21 has been blocked by the operator's hand, another device in the X-ray CT device 1, or the like, it is determined that the operation is not intended by the operator.

In the exposure signal generation function 75, it is determined to start an exposure process of the X-ray tube 11 when the operation of the operator depressing the foot switch 22 or the effective pressure sensor 24A is determined to be the operation intended by the operator. In the exposure signal generation function 75, an exposure signal for performing the X-rays exposure process of the X-ray tube 11 is generated when it is determined to start the X-ray exposure process.

The display processing function 76 causes an image to be displayed on the display of the ceiling suspension monitor 51 or the operation console 35. For example, the display processing function 76 causes the indoor camera 52 to display an image on the ceiling suspension monitor 51. The display processing function 76 may cause other images to be displayed on the ceiling suspension monitor 51. For example, the display processing function 76 may cause the image captured by the camera 26 to be displayed on the ceiling suspension monitor 51. The display processing function 76 may also cause a message, a GUI image, or the like for the operator to be displayed on the display of the operation console 35.

In the notification processing function 77, the operator is notified of the operation of the operator on the foot switch 22 or the effective pressure sensor 24A sensually, for example, by vibrations. In the notification processing function 77, the start of the exposure process of the X-ray tube 11 is determined in, for example, the exposure signal generation function 75, and the vibrator 53 is vibrated while the exposure process of the X-ray tube 11 is continued after an exposure signal is generated. In the notification processing function 77, when a device other than the vibrator 53 is used as the notification device, a process of operating the device may be performed while the exposure process of the X-ray tube 11 is continued. The operation console 35, the vibrator 53, or the like may be provided with a stop switch for stopping the vibration of the vibrator 53 during a vibration process. The notification processing function 77 is an example of a notification controller.

Components provided in the control device 18 may be decentralized and implemented by a plurality of pieces of hardware. The control device 18 may be provided in the gantry device 10 or the console device 40. Functions included in the control circuit 63 may be distributed to a plurality of circuits or may be made available by activating the application software stored in the memory.

Figure 7:
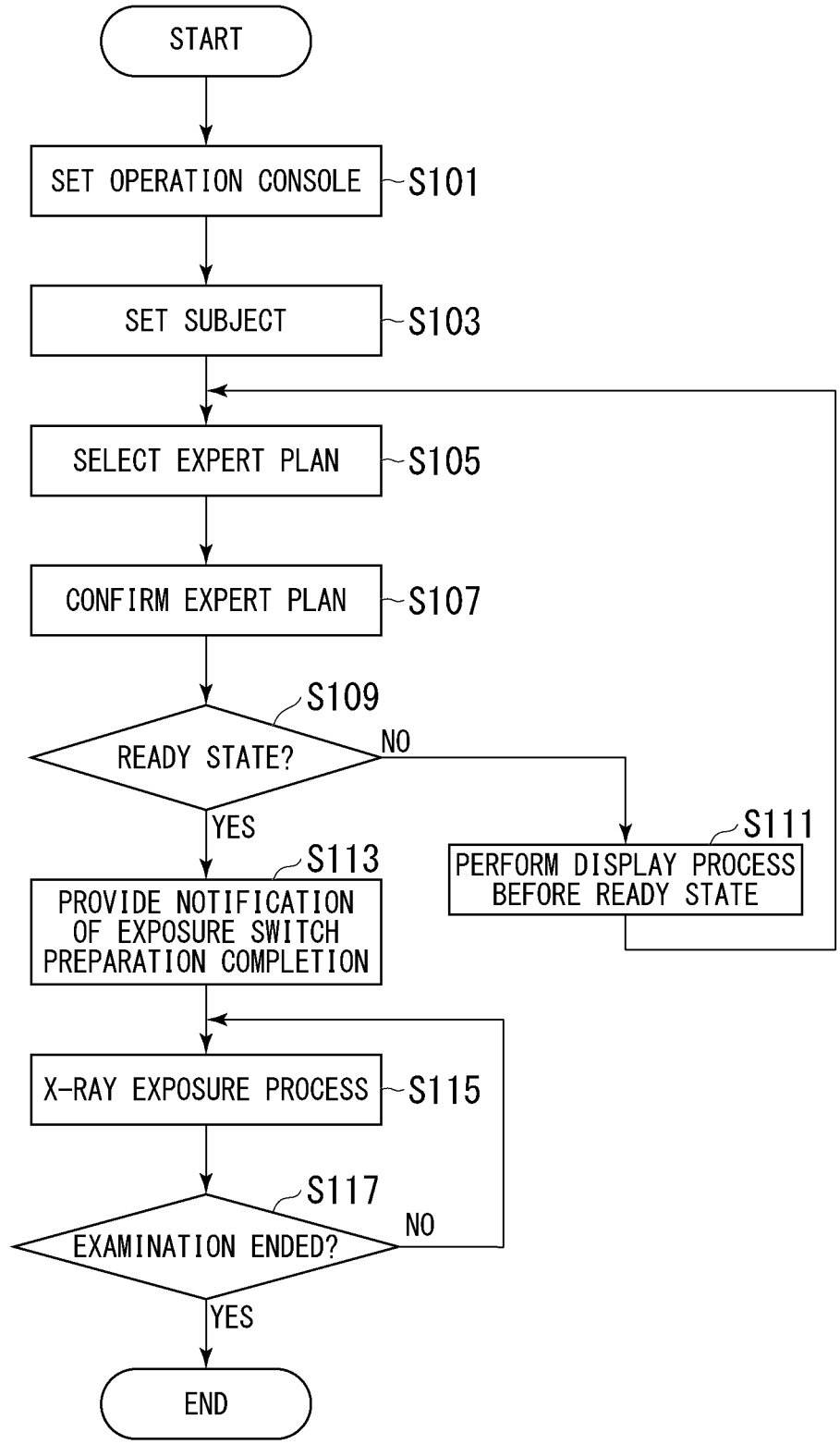
FIG. 7 is a flowchart showing an example of an examination flow using the X-ray CT device 1 according to the first embodiment.

Subsequently, a flow of examination using the X-ray CT device 1 and a process of the X-ray CT device 1 will be described. FIG. 7 is a flowchart showing an example of a flow of examination using the X-ray CT device 1 according to the first embodiment. In the X-ray CT device 1, first, the operator sets the operation console 35 on the bed device 30 (step S101). The operation console 35 is set at any position of the bed device 30 where the use of the operator is facilitated and is set, for example, at either the left or right position of the bed device 30 in accordance with content of the procedure. Subsequently, the subject P is set (placed) on the top plate 33 of the bed device 30 (step S103).

Subsequently, the expert plan is selected by the operator (step S105) and the expert plan is confirmed (step S107). When the expert plan is selected, the operator sets various types of scan conditions together. When the expert plan is confirmed, a control process of the exposure switch control function 69 becomes possible.

Subsequently, the exposure switch control function 69 determines whether or not the X-ray CT device 1 is in the ready state (step S109). When it is determined that the X-ray CT device 1 is not in the ready state, the display processing function 76 of the exposure switch control function 69 causes the display of the operation console 35 and the ceiling suspension monitor 51 to display information indicating that the state is before the ready state (step S111).

When it is determined that the X-ray CT device 1 is in the ready state, the exposure switch control function 69 causes the preparation notification lamp and the tabletop exposure switch 36 provided in the console device 40 to be turned on and provides the operator with a notification indicating that the exposure preparation has been completed (step S113). Subsequently, in the exposure switch control function 69, an X-ray exposure process is executed (step S115). The X-ray exposure process associated with the exposure switch control function 69 will be described below.

Subsequently, it is determined whether or not the operator has ended the examination (step S117). As a result, when it is determined that the operator has not ended the examination, the process is returned to step S115 and the X-ray exposure process is continued. When it is determined that the operator has ended the examination, the examination using the X-ray CT device 1 ends.

Figure 8:
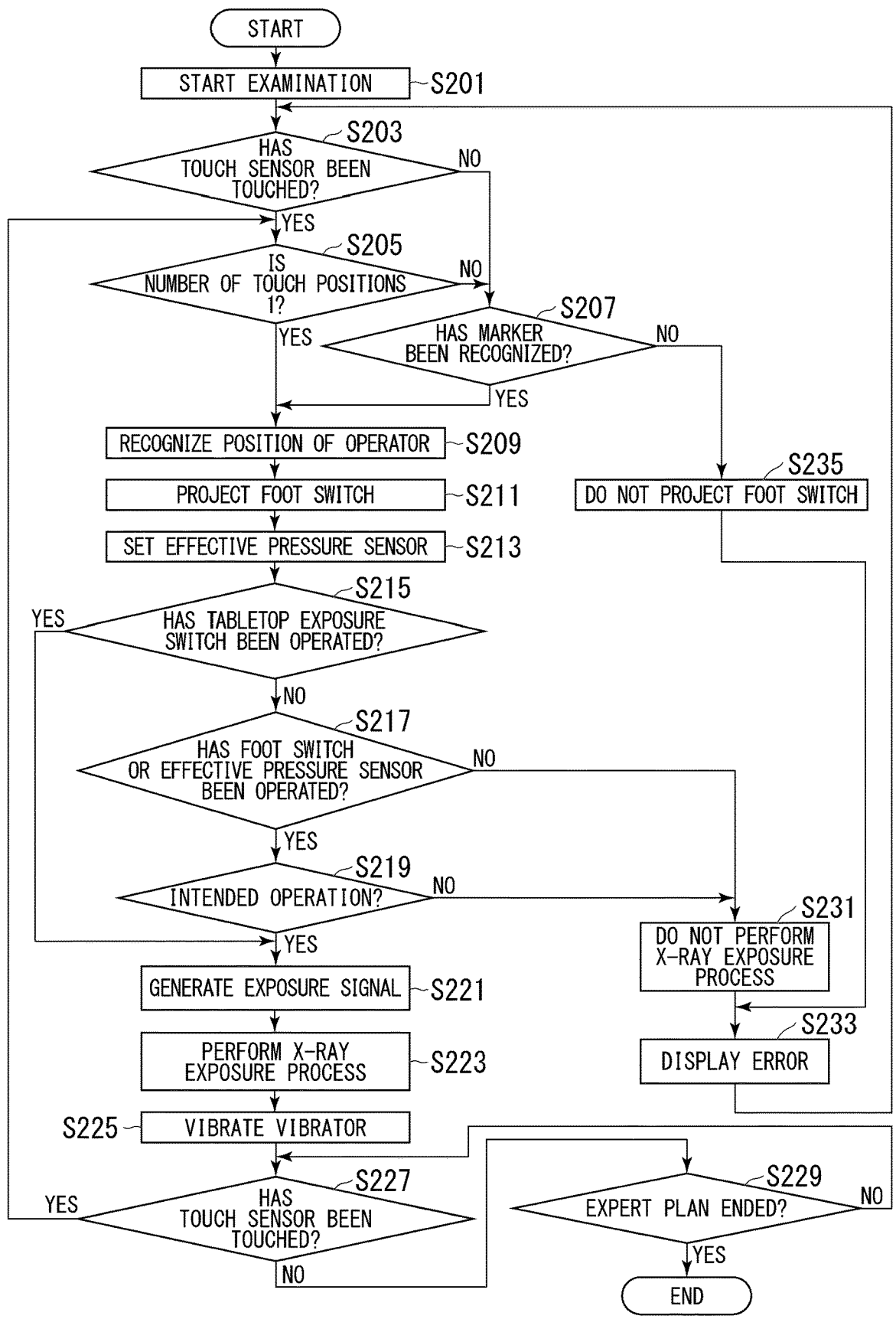
FIG. 8 is a flowchart showing an example of an X-ray exposure process according to the first embodiment.

Next, the X-ray exposure process will be described. FIG. 8 is a flowchart showing an example of the X-ray exposure process according to the first embodiment. When the operator starts the examination using the X-ray CT device 1 (step S201), the operator prepares for puncture and starts a procedure. Subsequently, the exposure switch control function 69 determines whether or not the operator has touched any of the touch sensors 23 in the touch sensor processing function 72 before the X-ray exposure is executed (step S203). The contact of the operator with the touch sensor 23 may be an operation in which the operator directly touches the touch sensor 23 or an operation in which the operator touches the touch sensor 23 via his/her shoes or clothing.

When it is determined that the operator has touched the touch sensor 23, it is determined whether or not the number of positions where the touch sensor 23 is in contact with the operator is only one in the touch sensor processing function 72 (step S205). When it is determined that the number of positions where the touch sensor 23 is in contact with the operator is only one (or is not two or more), the position of the touch sensor 23 touched by the operator is recognized as the position of the operator in the touch sensor processing function 72 (step S209).

When it is determined that the number of positions where the touch sensor 23 is in contact with the operator is not only one (or is two or more), it is determined whether or not the marker 25 included in the image captured by the camera 26 has been recognized in the image processing function 74 (step S207). When it is determined that the marker 25 included in the image captured by the camera 26 has been recognized, the image processing function 74 recognizes the position of the recognized marker 25 as the position of the operator (step S209).

Subsequently, the light projector/receiver control function 71 sets a position where the foot switch 22 is generated in the vicinity of the position of the operator on the basis of the position of the operator recognized by the touch sensor processing function 72 or the image processing function 74 and projects the foot switch 22 by projecting the laser light (step S211). Subsequently, in the pressure sensor processing function 73, the pressure sensor 24 in the vicinity of the position of the operator is set as the effective pressure sensor 24A (step S213).

After the projection of the foot switch and the setting of the effective pressure sensor 24A are completed, it is determined whether or not the tabletop exposure switch 36 has been operated in the exposure signal generation function 75 (step S215). In the exposure signal generation function 75, the determination of whether or not the tabletop exposure switch 36 has been operated is made before the projection of the foot switch and the setting of the effective pressure sensor 24A are performed. When it is determined that the tabletop exposure switch 36 has not been operated, it is determined whether or not the operator has performed a depression operation on either the foot switch 22 or the effective pressure sensor 24A on the basis of whether or not an electrical signal associated with the light projector 21A has been output in the exposure signal generation function 75 (step S217).

When it is determined that the operator has performed the depression operation on either the foot switch 22 or the effective pressure sensor 24A, it is determined whether or not the operation of the operator is an intended operation on the basis of an image analysis result according to image processing of the image processing function 74 in the exposure signal generation function 75 (step S219). When it is determined that the operation of the operator is an intended operation, an exposure signal is generated in the exposure signal generation function 75 (step S221). Similarly, when it is determined that the tabletop exposure switch 36 has been operated in step S215, an exposure signal is generated in the exposure signal generation function 75 (step S221).

Subsequently, the irradiation control function 65 causes the exposure signal generated in the exposure signal generation function 75 to be output to the X-ray high-voltage device 14 through the communication interface 61. The X-ray high-voltage device 14 to which the exposure signal is output starts the application of a voltage to the X-ray tube 11 and causes the X-ray tube 11 to perform the X-ray exposure process (step S223). While the exposure signal is generated in the exposure signal generation function 75 and the X-rays exposure process of the X-ray tube 11 is continued, the notification processing function 77 causes the vibrator 53 to be vibrated (step S225). By vibrating the vibrator 53, it is possible to give a feeling of operation to the operator.

Subsequently, the X-ray CT device 1 determines whether or not the operator has touched the touch sensor 23 again (step S227). When it is determined that the operator has touched the touch sensor 23 again, the X-ray CT device 1 returns the process to step S205. When it is determined that the operator has not touched the touch sensor 23 again, the X-ray CT device 1 determines whether or not the expert plan has ended (step S229). When it is determined that the expert plan has not ended, the X-ray CT device 1 returns the process to step S227. When it is determined that the expert plan has ended, the X-ray CT device 1 ends the process shown in FIG. 8.

When it is determined that neither the operation of depressing the foot switch 22 nor the operation of depressing the effective pressure sensor 24A has been performed by the operator in step S217, no exposure signal is generated in the exposure signal generation function 75 and the exposure process of the X-ray tube 11 is not performed (step S231). Similarly, when it is determined that the operation of the operator is not the intended operation in step S219, no exposure signal is generated in the exposure signal generation function 75 and no exposure from the X-ray tube 11 is performed (step S231). Subsequently, the display processing function 76 causes the display of the ceiling suspension monitor 51 or the operation console 35 to display an error indicating a state in which the foot switch 22 cannot be used (step S233). Subsequently, the exposure switch control function 69 causes the process to return to step S203.

When it is determined that the marker 25 has not been recognized in the image processing function 74 in step S207, the exposure switch control function 69 causes the display of the ceiling suspension monitor 51 or the operation console 35 to display an error (step S235). Subsequently, the exposure switch control function 69 causes the process to return to step S203. When the error is displayed, a warning may be displayed together.

The X-ray CT device 1 of the first embodiment recognizes the position of the operator, generates the foot switch 22 for causing the X-rays exposure process of the X-ray tube 11 to be carried out on the basis of the recognized position of the operator, and sets the effective pressure sensor 24A. Thus, it is possible to improve the operability when X-rays are radiated.

Also, in the X-ray CT device 1 of the first embodiment, the foot switch 22 is formed by projecting laser light using the laser light projector/receiver 21 and the effective pressure sensor 24A is set in the pressure sensor 24 spread in advance. Thus, for example, a cable connecting the operation console 35 and the sensor or the like so that the operation of the operator is transferred to the control device 18 is not provided in an externally exposed state. Therefore, it is possible to eliminate problems such as difficulty in carrying the foot switch, unfavorable hygiene, and this being an opportunity for disconnection of a cable when the operator holds and moves the foot switch by hand.

In the above-described first embodiment, when either the foot switch 22 or the effective pressure sensor 24A is depressed, an exposure signal is generated and the exposure process of the X-ray tube 11 is started. On the other hand, when an operation of depressing both the foot switch 22 and the effective pressure sensor 24A has been performed, an exposure signal may be generated and the exposure process of the X-ray tube 11 may be started. Although both a process of generating the foot switch 22 by radiating the laser light and a process of setting the effective pressure sensor 24A are performed in the above-described first embodiment, either the process of generating the foot switch 22 or the process of setting the effective pressure sensor 24A is performed. For example, when the effective pressure sensor 24A is not set and the foot switch 22 is generated, it is only necessary to start the exposure process of the X-ray tube 11 after the exposure signal is generated when the depression operation is performed on the foot switch 22.

Second Embodiment

Next, a second embodiment will be described. An X-ray CT device 1 of the second embodiment is mainly different in the process of the exposure switch control function 69 as compared with the first embodiment. Hereinafter, differences from the X-ray CT device 1 of the first embodiment will be mainly described with respect to the X-ray CT device 1 of the second embodiment.

In the second embodiment, the operator provides (pastes) the marker 25 on, for example, the toe of his/her foot, and executes an examination process using the X-ray CT device 1. In the X-ray CT device 1, in the image processing function 74 in the exposure switch control function 69, image processing is performed on images transmitted by the camera 26 and the indoor camera 52, the images are analyzed, and the marker 25 included in the images is searched for. The camera 26 and the indoor camera 52 image the marker 25. The camera 26 and the indoor camera 52 are examples of an imaging device.

After the marker 25 is searched for, the movement of the marker 25 is detected in the image processing function 74. In the exposure signal generation function 75, a depression operation of the operator is detected on the basis of the movement of the marker 25 detected by the image processing function 74 (the movement of the marker 25 imaged by the camera 26 and the indoor camera 52). The depression operation is an example of an operation of the operator on the marker. In the exposure signal generation function 75, for example, the depression operation of the operator is detected when the previously recognized movement of the marker 25 at the time of the depression operation performed by the operator is compared with the movement of the marker 25 detected in the image processing function 74. In the exposure signal generation function 75, when the depression operation of the operator has been detected in the exposure signal generation function 75, the exposure signal is generated and output to the X-ray high-voltage device 14 by the communication interface 61.

In the X-ray CT device 1 of the second embodiment, the image captured by the camera 26 or the indoor camera 52 is subjected to image processing, image analysis is performed to search for the marker 25, and the operation of the operator is detected on the basis of the movement of the marker 25. The operation of the operator can also be detected using the image captured by the camera 26 or the indoor camera 52.

In the second embodiment, the operation of the operator is detected on the basis of the image captured by the camera 26 or the indoor camera 52. Thus, the operation of the operator using the touch sensor 23 or the effective pressure sensor 24A may not be detected or these detections may be used in combination. When the operation of the operator is not detected using the touch sensor 23 or the effective pressure sensor 24A, it is not necessary to provide the laser light projector/receiver 21 and the pressure sensor 24, so that the device can be simplified.

Although the position of the operator is detected using the touch sensor 23 and the pressure sensor 24 in the above-described embodiment, the position of the operator may be detected using either the touch sensor 23 or the pressure sensor 24. In this case, because it is not necessary to provide either the touch sensor 23 or the pressure sensor 24, the device can be simplified.

Furthermore, instead of or in addition to detecting the position of the operator using the touch sensor 23 and the pressure sensor 24, the position of the operator (the operator's foot or the like) may be detected on the basis of the image captured by the camera 26 or the indoor camera 52. In this case, because it is not necessary to provide the touch sensor 23 and the pressure sensor 24, the device can be simplified. Furthermore, in this case, when it is detected that the position of the operator has moved on the basis of the image captured by the camera 26 or the indoor camera 52, the foot switch 22 and the effective pressure sensor 24A may be configured to be moved in accordance with the movement of the operator. Also, a mode in which the operation of the operator is detected may be a mode of any one of the first embodiment and the second embodiment or a plurality of modes may be used in combination as appropriate. When a plurality of modes are combined, a mode in which operations of a plurality of operators are detected may be provided. The X-ray exposure process may be started when some of the modes are operated or the X-ray exposure process may be started when all the modes are operated.

Although the vibrator 53 is provided on the ankle of the operator in the above-described embodiment, the vibrator 53 may be provided on a portion, for example, a toe, a thigh, a wrist, or the like, other than the ankle of the operator. Although the vibrator 53 is used as the notification device, the notification device may be a device other than the vibrator 53 as long as it is a device that makes an appeal to the five senses of the operator. For example, the notification device may be a fan for blowing wind to the operator, a display displayed on the ceiling suspension monitor 51 for making an appeal to the operator's vision, or a speaker for outputting a sound such as sound guidance for making an appeal to the operator's hearing or an operation sound. Also, the position where the notification device is attached may be a position other than the ankle of the operator.

Also, the X-ray CT device 1 may include a training mode for executing the training of the examination in addition to the execution mode when the examination is actually executed as a control mode. When the X-ray CT device 1 is controlled in the training mode, for example, a screen for describing a method of operating the foot switch 22 and the pressure sensor 24 (the effective pressure sensor 24A) is displayed on the display of the ceiling suspension monitor 51 or the operation console 35.

In the training mode, the foot switch or the pressure sensor 24 operates as in the execution mode, but the X-rays exposure process of the X-ray tube 11 is not performed. When the X-ray CT device 1 is controlled in the training mode, an attention attracting process is performed when an operation method for and an operation on the foot switch 22 or the effective pressure sensor 24A are performed in a state in which there is no X-rays exposure process of the X-ray tube 11. The X-ray CT device 1 may include such a training mode.

Also, in the above-described embodiment, the operator is not notified that the foot switch 22 has been generated. On the other hand, the laser light may be projected onto the floor surface by the laser light projector/receiver 21 and the fact that the foot switch 22 is generated may be displayed on the display of the operation console 35 or the ceiling suspension monitor 51 so that a notification is provided to the operator. When the foot switch 22 is not displayed, the operator may be notified that the foot switch 22 is generated by touching the touch sensor 23.

Also, in the above-described embodiment, the laser light projector/receiver 21 projects the laser light to generate the foot switch 22 when the X-ray CT device 1 is controlled by the expert plan and is in the ready state. On the other hand, the laser light projector/receiver 21 may be configured to project the laser light at event a time other than the time when the X-ray CT device 1 is in the ready state and to allow the laser light projected when the X-ray CT device 1 is in the ready state to function as the foot switch 22.

In this case, for example, properties such as a color, brightness, and a magnitude of the laser light may be different between a case where the projected light functions as the foot switch 22 and a case where the projected light does not function as the foot switch 22. In this case, the operator can recognize a position where the foot switch 22 is generated even before the ready state is reached.

Although the position of the effective pressure sensor 24A in the pressure sensor 24 is not specified in the above-described embodiment, the position of the effective pressure sensor 24A may be specified. For example, a light-emitting device such as an LED may be set in a range where the pressure sensor 24 is spread and an LED at a position surrounding the pressure sensor 24 serving as the effective pressure sensor 24A or at a position in the vicinity thereof may be turned on or blinked.

Also, instead of the pressure sensor 24, a plurality of light-emitting devices such as LEDs may be provided. In this case, for example, the operation of the operator may be detected on the basis of a light receiving result when the light-emitting device at the position corresponding to the position of the effective pressure sensor 24A may be allowed to emit light and the light emitted from the light-emitting device is received by a light-receiving device.

An irradiator configured to irradiate a subject placed on a bed with X-rays; an exposure switch device configured to receive an operation of an operator related to X-ray irradiation; and a control device configured to control the X-ray irradiation based on the X-rays are provided. The exposure switch device includes a switch set on the basis of a position of the operator and configured to detect the operation of the operator; and an output configured to output an operation signal based on the operation of the operator to the control device when the operation of the operator has been detected by the switch. The control device causes the irradiator to radiate the X-rays on the basis of the operation signal output by the exposure switch device. Thereby, the operability when the irradiator radiates X-rays can be improved.

While several embodiments of the present invention have been described, these embodiments have been presented by way of example only, and are not intended to limit the scope of the inventions. These embodiments may be embodied in a variety of other forms. Various omissions, substitutions, and combinations may be made without departing from the spirit of the inventions. The inventions described in the accompanying claims and their equivalents are intended to cover such embodiments or modifications as would fall within the scope and spirit of the inventions.

What is claimed is:

1. An X-ray imaging device, comprising:
an irradiator configured to irradiate a subject, placed on a bed, with X-rays;
an exposure switch device configured to receive an operation of an operator related to X-ray irradiation; and
a control device configured to control the X-ray irradiation based on the X-rays,
wherein the exposure switch device comprises:
a switch set based on a position of the operator and configured to detect the operation of the operator; and
an output configured to output an operation signal based on the operation of the operator to the control device when the operation of the operator has been detected by the switch,
wherein the control device is further configured to cause the irradiator to radiate the X-rays based on the operation signal output by the exposure switch device,
wherein the switch includes
a light projector configured to generate a foot switch by projecting visible light;
a light-receiver configured to receive reflected light related to the visible light; and
a pressure sensor provided around the bed, and
wherein the switch is configured to detect the operation of the operator based on a reflected light reception result of the light-receiver and a pressure detected by the pressure sensor.

2. The X-ray imaging device according to claim 1, wherein the switch further includes:
a marker attached to the operator; and
an imaging device configured to image the marker,
wherein the switch is configured to detect the operation of the operator further based on movement of the marker imaged by the imaging device.

3. The X-ray imaging device according to claim 1, wherein the exposure switch device further includes a position detector configured to detect a position of the operator.

4. The X-ray imaging device according to claim 1, wherein an operation console that is operated by the operator is provided on the bed, and
wherein the exposure switch device further includes a tabletop exposure switch provided on the operation console and configured to output the operation signal to the control device according to an operation of the operator.

5. The X-ray imaging device according to claim 1, further comprising a notification controller configured to control a notification device configured to provide a notification of the operation of the operator on the switch while acting on senses of the operator.

6. The X-ray imaging device according to claim 3, wherein the position detector includes a plurality of touch sensors provided at a plurality of positions on at least one of a gantry configured to accommodate the irradiator and the bed, and configured to be able to come into contact with the operator, and
wherein the position detector is further configured to detect the position of the operator based on a touch sensor in contact with the operator among the plurality of touch sensors.

7. The X-ray imaging device according to claim 3, wherein the position detector includes:
a camera configured to capture an image of the operator; and
an image processor configured to process the image captured by the camera, and
wherein the position detector is further configured to detect the position of the operator based on an image processing result of the image processor.

8. The X-ray imaging device according to claim 7, wherein the switch includes a marker attached to the operator, and
wherein the position detector is configured to detect a position where the marker has been recognized as the position of the operator when the marker attached to the operator is included in the image captured by the camera.

9. The X-ray imaging device according to claim 5, wherein the notification device is a vibration device configured to give vibrations to the operator.

10. An X-ray imaging system comprising:
the X-ray imaging device according to claim 5; and
the notification device configured to provide the notification of the operation of the operator on the switch while acting on the senses of the operator.

11. An X-ray imaging device, comprising:
an irradiator configured to irradiate a subject placed on a bed with X-rays;
an exposure switch device configured to receive an operation of an operator related to X-ray irradiation; and
a control device configured to control the X-ray irradiation based on the X-rays,
wherein the exposure switch device comprises
a switch set based on a position of the operator and configured to detect the operation of the operator; and
an output configured to output an operation signal based on the operation of the operator to the control device when the operation of the operator has been detected by the switch,
wherein the control device is configured to cause the irradiator to radiate the X-rays based on the operation signal output by the exposure switch device,
wherein the switch includes
a light projector configured to generate a foot switch by projecting visible light;
a light-receiver configured to receive reflected light related to the visible light;
a marker attached to the operator; and
an imaging device configured to image the marker, and
wherein the switch is configured to detect the operation of the operator based on a reflected light reception result of the light-receiver and movement of the marker imaged by the imaging device.

12. An X-ray imaging device, comprising:
an irradiator configured to irradiate a subject placed on a bed with X-rays;
an exposure switch device configured to receive an operation of an operator related to X-ray irradiation; and
a control device configured to control the X-ray irradiation based on the X-rays,
wherein the exposure switch device comprises
a switch set based on a position of the operator and configured to detect the operation of the operator; and
an output configured to output an operation signal based on the operation of the operator to the control device when the operation of the operator has been detected by the switch, wherein the control device is configured to cause the irradiator to radiate the X-rays based on the operation signal output by the exposure switch device, wherein the switch includes
- a pressure sensor provided around the bed;
- a marker attached to the operator; and
- an imaging device configured to image the marker, and wherein the switch detects the operation of the operator based on a pressure detected by the pressure sensor and a movement of the marker imaged by the imaging device.

13. A method of controlling an X-ray imaging device, the X-ray imaging device including an irradiator configured to irradiate a subject placed on a bed with X-rays; an exposure switch device configured to receive an operation of an operator related to X-ray irradiation; and a control device configured to control the X-ray irradiation based on the X-rays, wherein the exposure switch device includes a switch set based on a position of the operator and configured to detect the operation of the operator; and an output configured to output an operation signal based on the operation of the operator to the control device when the operation of the operator has been detected by the switch, and wherein the switch includes a light projector configured to generate a foot switch by projecting visible light, a light-receiver configured to receive reflected light related to the visible light; and a pressure sensor provided around the bed, the method comprising:
- causing, by the control device provided in a computer of the X-ray imaging device, the irradiator to irradiate X-rays based on the operation signal output by the exposure switch device, and
- detecting, by the switch, the operation of the operator based on a reflected light reception result of the light-receiver and a pressure detected by the pressure sensor.

* * * * *